(12) United States Patent
Marozsak et al.

(10) Patent No.: US 8,688,052 B2
(45) Date of Patent: Apr. 1, 2014

(54) APPARATUS AND METHOD FOR PHASE NOISE SELF-TEST

(75) Inventors: Tamas Marozsak, Budapest Kalászi köz (HU); Pio Balmelli, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 45 days.

(21) Appl. No.: 13/342,687

(22) Filed: Jan. 3, 2012

(65) Prior Publication Data
US 2013/0170532 A1     Jul. 4, 2013

(51) Int. Cl.
*H04B 17/00*  (2006.01)

(52) U.S. Cl.
USPC .................................. 455/67.11; 455/226.1

(58) Field of Classification Search
USPC ......................... 455/423, 67.11, 67.14, 226.1
See application file for complete search history.

(56) References Cited

U.S. PATENT DOCUMENTS

| | | | |
|---|---|---|---|
| 4,035,736 A * | 7/1977 | Lance et al. | 331/2 |
| 5,412,325 A | 5/1995 | Meyers | |
| 7,205,924 B2 * | 4/2007 | Vemulapalli et al. | 341/166 |
| 7,340,219 B2 * | 3/2008 | Heaton et al. | 455/67.11 |
| 7,501,905 B2 * | 3/2009 | Ichiyama et al. | 331/74 |
| 7,756,487 B2 * | 7/2010 | Lerner et al. | 455/76 |
| 7,778,610 B2 * | 8/2010 | Staszewski et al. | 455/76 |
| 7,952,408 B2 | 5/2011 | Eisenstadt et al. | |
| 8,248,297 B1 | 8/2012 | Baker et al. | |

* cited by examiner

*Primary Examiner* — Sonny Trinh
(74) *Attorney, Agent, or Firm* — Meyertons, Hood, Kivlin, Kowert & Goetzel, P.C.; Erik A. Heter

(57) ABSTRACT

An integrated circuit (IC) having a radio receiver configured to perform a jitter self-test is disclosed. In one embodiment, an IC includes a radio receiver and a pulse generator. The pulse generator is configured to generate a pulse train based on a first periodic signal received from the radio receiver. The radio receiver is configured to use the pulse train to determine an amount of phase noise generated by a local oscillator of the radio receiver. The pulse generator and the radio receiver are implemented on the same IC die.

18 Claims, 4 Drawing Sheets

APPARATUS AND METHOD FOR PHASE NOISE SELF-TEST

BACKGROUND

1. Field of the Invention

This invention relates to radio receivers, and more particularly, to the testing of radio receivers.

2. Description of the Related Art

Radio receivers are well known in the electronic arts. A radio receiver may include components such as a low noise amplifier (LNA), a local oscillator (LO), a mixer, gain amplifiers, and so on. Some radio receivers may also include components such as an analog-to-digital converter (ADC) for converting recovered signals into a digital format for further processing.

With advances in integrated circuit technology, some radio receivers may now be implemented on a single integrated circuit die. This may enable such receivers to be manufactured in large quantities and used in a wide variety of devices, including small, portable devices such as cellular telephones, personal 2-way radios, and so forth. Receivers implemented in integrated circuits may also be used in devices such as wireless routers, television sets, and other systems designed to receive radio signals.

Following the completion of the manufacturing process, receivers implemented on integrated circuits may undergo production testing. During such production testing, the receiver may be tested to determine various parameters and metrics. The tests may be conducted by an external tester that may inject various signals into the receiver and monitor outputs to determine its parameters.

SUMMARY OF THE DISCLOSURE

An integrated circuit (IC) having a radio receiver configured to perform a jitter self-test is disclosed. In one embodiment, an IC includes a radio receiver and a pulse generator. The pulse generator is configured to generate a pulse train based on a first periodic signal received from the radio receiver. The radio receiver is configured to use the pulse train to determine an amount of phase noise generated by a local oscillator of the radio receiver. The pulse generator and the radio receiver are implemented on the same IC die.

In one embodiment, a method for performing a jitter self-test includes generating a pulse train using a pulse generator, wherein the pulse train is based on a received first periodic signal. The method further includes providing the pulse train to a radio receiver implemented on a same integrated circuit die as the pulse generator. A self-test is conducted to determine an amount of phase noise generated by a local oscillator of the radio receiver, wherein the self-test is conducted using the pulse train.

It is noted that the terms 'jitter' and 'phase noise' may be used interchangeably, as these two parameters are directly related. More particularly, jitter may be defined as the stability of an oscillator output signal in the time domain, while phase noise may be defined as the stability of an oscillator output signal in the frequency domain.

BRIEF DESCRIPTION OF THE DRAWINGS

Other aspects of the disclosure will become apparent upon reading the following detailed description and upon reference to the accompanying drawings which are briefly described as follows.

Figure 1:
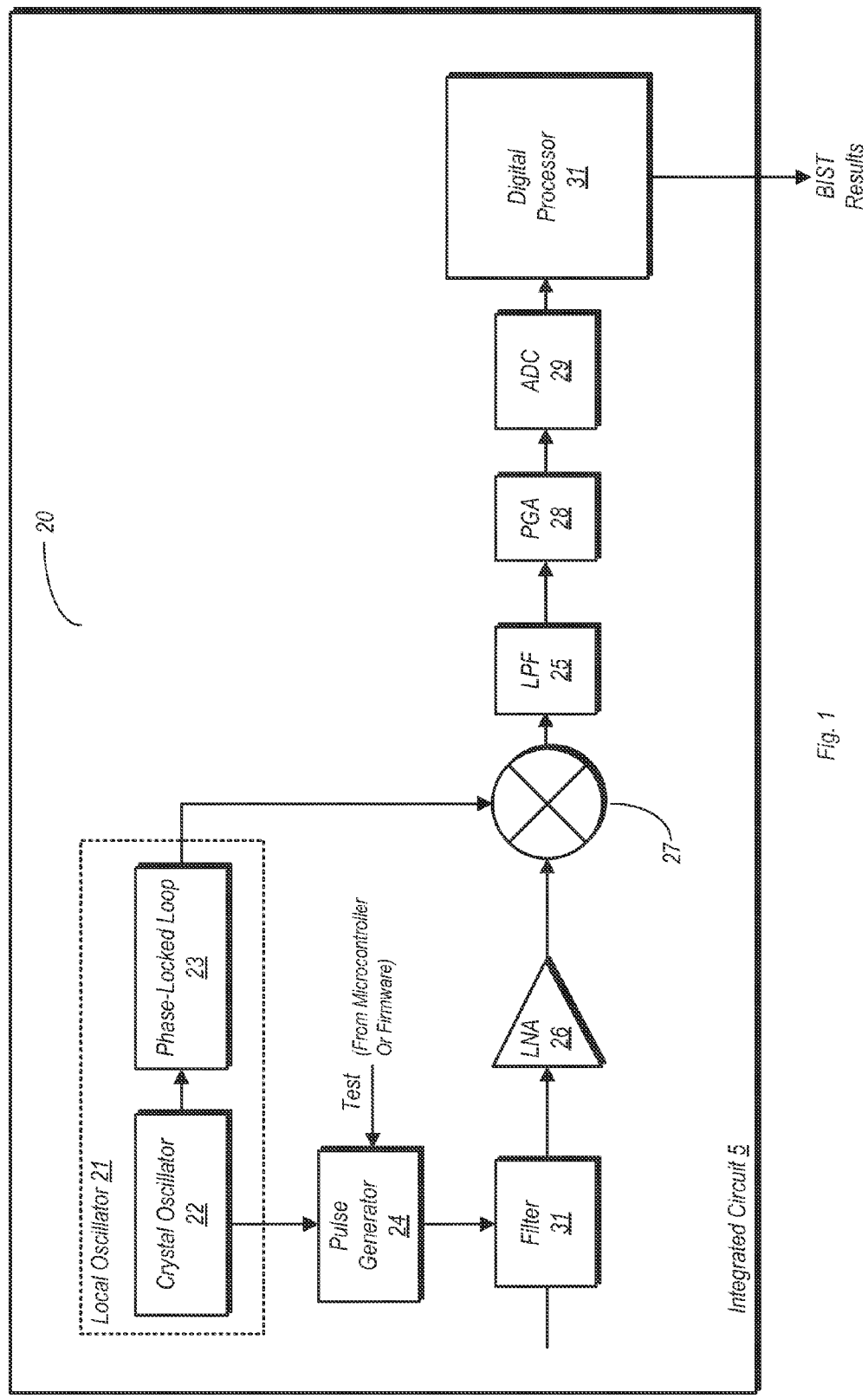
FIG. 1 is a block diagram of one embodiment of an integrated circuit having a radio receiver implemented thereon, wherein the radio receiver is configured to perform a phase noise self-test.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION

Turning now to FIG. 1, a block diagram of one embodiment an integrated circuit (IC) having a radio receiver and a pulse generator is shown. In the embodiment shown, IC 5 includes a radio receiver 20 and a pulse generator 24. It is noted that each of the components shown, with the exception of pulse generator 24, are considered to be part of radio receiver 20 in this embodiment. However, each of the components shown in FIG. 1 may be implemented on the same IC die.

Using pulse generator 24, a built-in self-test (BIST) to determine phase noise (sometimes referred to as jitter) generated by local oscillator 21 may be conducted. The BIST may be initiated in the illustrated embodiment by a signal (Test) received from a microcontroller or firmware implemented on the IC (not shown here). Pulse generator 24 may be activated responsive to receiving the Test signal. When the test signal is not asserted (or not connected), pulse generator 24 may be inactive. No other external signal (e.g., an external radio frequency signal) is used to conduct the phase noise test of local oscillator 21.

In the embodiment shown, local oscillator 21 includes a crystal oscillator 22 and a phase locked loop (PLL) 23. Crystal oscillator 22 is configured to generate a periodic signal that may be provided to both pulse generator 24 and PLL 23. When the Test signal is asserted (and thus the phase noise testing is in progress), pulse generator 24 may generate a pulse train responsive to the periodic signal received from crystal oscillator 22. Furthermore, PLL 23 may generate a local oscillator output signal responsive to the signal received from crystal oscillator 22. In one embodiment, the local oscillator output signal may have a frequency that is greater than the frequency of the signal generated by crystal oscillator 22. It is noted that the crystal oscillator discussed herein represents only one type of oscillator that may be used, and thus other oscillator types (e.g., micro-elector-mechanical, or MEMS, oscillators) are also possible and contemplated for implementation in a radio receiver otherwise configured in the same manner as the receivers disclosed herein. It is further noted that embodiments are possible and contemplated wherein pulse generator 24 receives a periodic signal from a source other than crystal oscillator 22. For example, pulse generator 24 in an alternate embodiment may receive a periodic signal from another crystal oscillator that is not part of local oscillator 21, from a MEMS oscillator, or from any other suitable oscillator that is not otherwise part of local oscillator 21 or radio receiver 20.

In the embodiment shown in FIG. 1, the pulses of the pulse train generated by pulse generator 24 may be current pulses. The pulses generated by pulse generator 24 may vary in duty cycle, but may occur at a frequency that is substantially the same as the output signal of the crystal oscillator. In one embodiment, the amplitude of the harmonics of the pulse train may be dependent at least in part on the duty cycle. More particularly, a shorter duty cycle may produce harmonics having a lower amplitude than those associated with pulses having a longer duty cycle. However, the energy distribution of the harmonics may be more uniform for shorter duty cycles posts than for longer ones. In one embodiment, the duty cycle may be chosen based at least in part on the desired harmonic frequency to be used in the phase noise test.

The pulse train generated by pulse generator 24 may be input into low noise amplifier (LNA) 26 in this embodiment. LNA 26 may amplify the generated pulses and provide them to mixer 27. In the embodiment shown, a filter 31 is coupled to receive the pulse train from pulse generator 24. Filter 31 may be used to filter out frequencies that are not close to the frequency of the signal output from PLL 23, which in turn is close to the frequency of the desired harmonic component. This may prevent LNA 26 from being oversaturated with undesired frequency components. In an alternate embodiment, a filter may be implemented between LNA 26 and mixer 27. The filter may be any type of filter suitable for filtering received radio signals prior to downconversion by mixer 27. It is further noted that the use of the filter 31 here is optional.

In the embodiment shown, mixer 27 is also coupled to receive the signal output by PLL 23, which is the local oscillator output signal. Mixer 27 may in turn produce a mixer output signal. During testing operations, PLL 23 may be configured to provide the local oscillator output signal at a frequency that is near that of the desired harmonic frequency to be used in the test. The mixer output signal may include a first tone at a frequency that is a difference between the desired harmonic frequency and the signal output by the local oscillator (e.g., $F_{LO}-F_{harmonic}$). Additional tones may be produced at intervals corresponding to the base frequency of the pulse train and crystal oscillator. For example, if the crystal oscillator output signal and the pulse train both have a base frequency of 30 MHz, and the first tone output from mixer 27 has a frequency of 5 MHz, then subsequent tones may appear at 35 MHz, 65 MHz, and so forth.

During normal (i.e. non-testing) operation of IC 5, LNA 26 is in the receive path and may be coupled to an antenna. Thus, during normal operation of receiver 20, mixer 27 may perform a downconversion of a received radio frequency (RF) signal modulated with information to be extracted therefrom. In one embodiment, receiver 20 may be a heterodyne receiver, and thus mixer 27 may generate an intermediate frequency (IF) signal that may be further downconverted further down in the receive chain. In another embodiment, receiver 20 may be a direct conversion receiver, and thus mixer 27 may be configured to output a baseband signal.

During the self-test described herein, the tone having a frequency that is a harmonic multiple of the pulse train frequency may act as a substitute for the radio frequency (RF) signal normally received in the receive path. Furthermore, since the tone is generated based on the pulse train output by pulse generator 24 (which is on the same IC), no external RF signal needs to be provided to the receive path of receiver 20.

The pulse train and its corresponding harmonics, along with the local oscillator output signal may include at least some phase noise. With sufficiently uniform energy distribution of the harmonics of the pulse train, the phase noise of the harmonic tones may be relatively small in comparison to the local oscillator output signal. Accordingly, phase noise from the local oscillator output signal may dominate any phase noise present in the mixer output signal. For example, the amount of phase noise generated by the local oscillator may be ten times that generated by the harmonic tone associated with the pulse train. Thus, a measurement of the phase noise of the mixer output signal may be sufficient to determine the phase noise present in the output signal of the local oscillator.

In the embodiment shown, the output of mixer 27 is provided to low pass filter 25. Low pass filter 25 may have a cutoff frequency that may allow a downconverted version of a first harmonic tone to pass, while attenuating remaining ones of the downconverted harmonic tones. For example, if the crystal oscillator and the pulse train each have a base frequency of 30 MHz, and it is desired to use the $31^{st}$ harmonic (i.e. 930 MHz), the local oscillator output signal may be provided at 935 MHz. This may result in a mixer output signal having a first tone at 5 MHz (the difference between the local oscillator output signal and the $31^{st}$ harmonic) with additional tones spaced at 30 MHz (e.g., a second tone at 35 MHz, a third tone at 65 MHz, and so on). Low pass filter 25 may be configured to allow the 5 MHz tone to pass, while attenuating the remaining tones. Thus, the output from low pass filter 25 may be a downconverted version of the $31^{st}$ harmonic. It is noted that the pass band for low pass filter 25 may be adjustable in some embodiments.

The output of low pass filter 25 may be provided to programmable gain amplifier (PGA) 28. It is noted that PGA 28 is not required for all embodiments. In this embodiment, PGA 28 may amplify the filtered mixer output signal by a programmed gain factor. The output of PGA 28 may then be provided to analog-to-digital converter (ADC) 29. In lieu of using an actual low pass filter, some embodiments may realize the low pass filtering function within PGA 28 or ADC 29. ADC 29 may convert the filtered mixer output signal from an analog format into a digital format. The digital version of the filtered mixer output signal may then be provided to digital processor 31. During normal operation, digital processor 31 may perform additional processing of the received signal (e.g., extraction of information in the base band, etc.). In the embodiment shown, digital processor 31 is also configured to determine the phase noise of the filtered mixer output signal using its received digital counterpart. Any suitable method of determining the phase noise of the filtered mixer output signal using its received digital counterpart may be used. Furthermore, digital processor 31 may also execute software or firmware instructions in the determining the phase noise. The results of the phase noise test may be output by digital processor 31 to an external destination. In one use, the BIST may be conducted as a production test, with those parts not meeting desired specification discarded or retained for further analysis.

Figure 2:
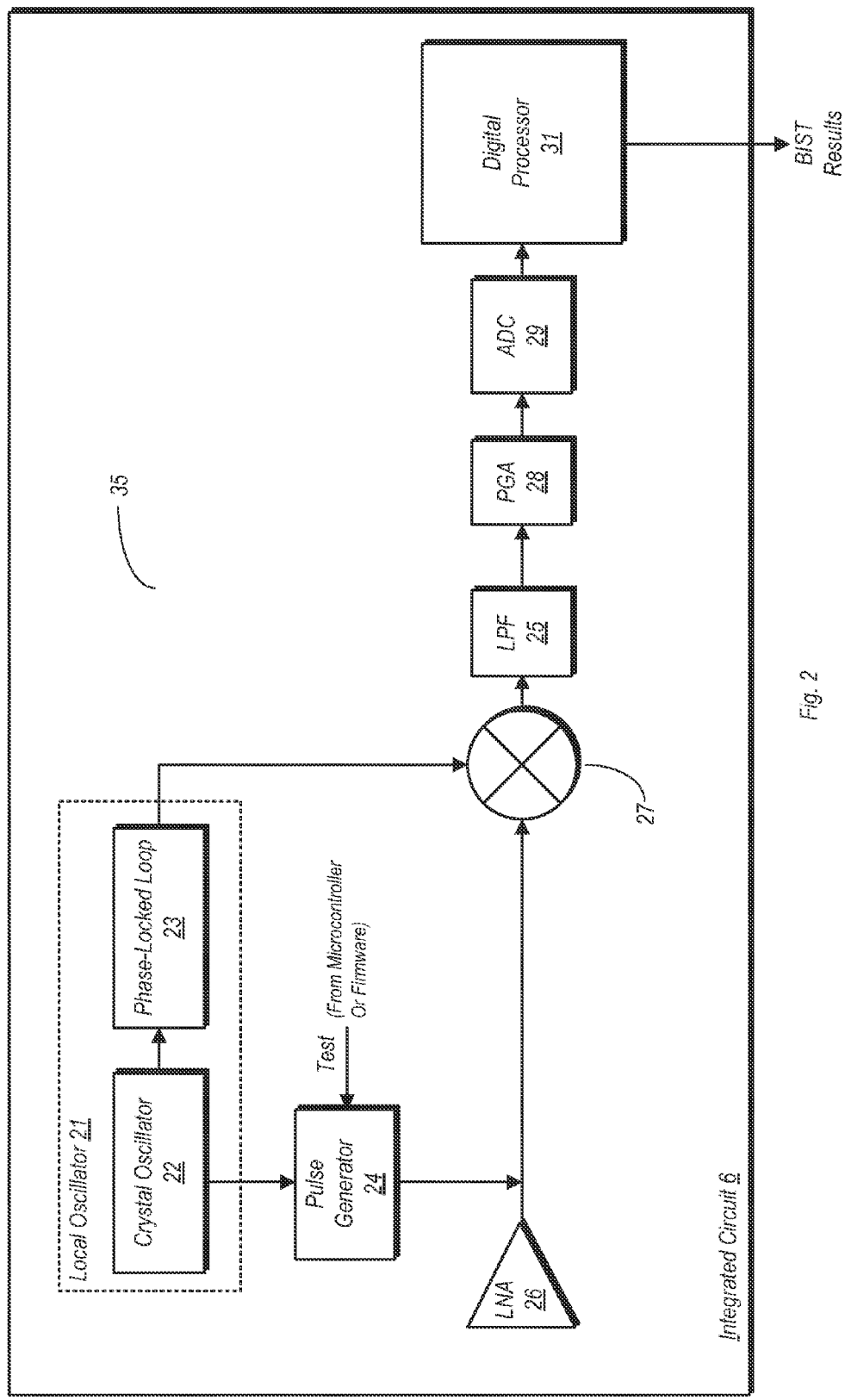
FIG. 2 is a block diagram of another embodiment of an integrated circuit having a radio receiver implemented thereon, wherein the radio receiver is configured to perform a phase noise self-test.

FIG. 2 is a block diagram of another embodiment of an integrated circuit having a radio receiver implemented thereon, wherein the radio receiver is configured to perform a phase noise self-test. IC 5 as shown in FIG. 2 is similar to that of FIG. 1, and includes a pulse generator 24 and a radio receiver 35. The primary difference between these two embodiments is the point of input of the pulse train output by pulse generator 24. In this particular embodiment, LNA 26 may be powered off during the conducting of the phase noise self-test. Thus, the pulse train may be input directly into mixer 27. The embodiment of FIG. 2 may be utilized in situations where further amplification of the pulse train input into mixer 27 is not desired.

Figure 3:
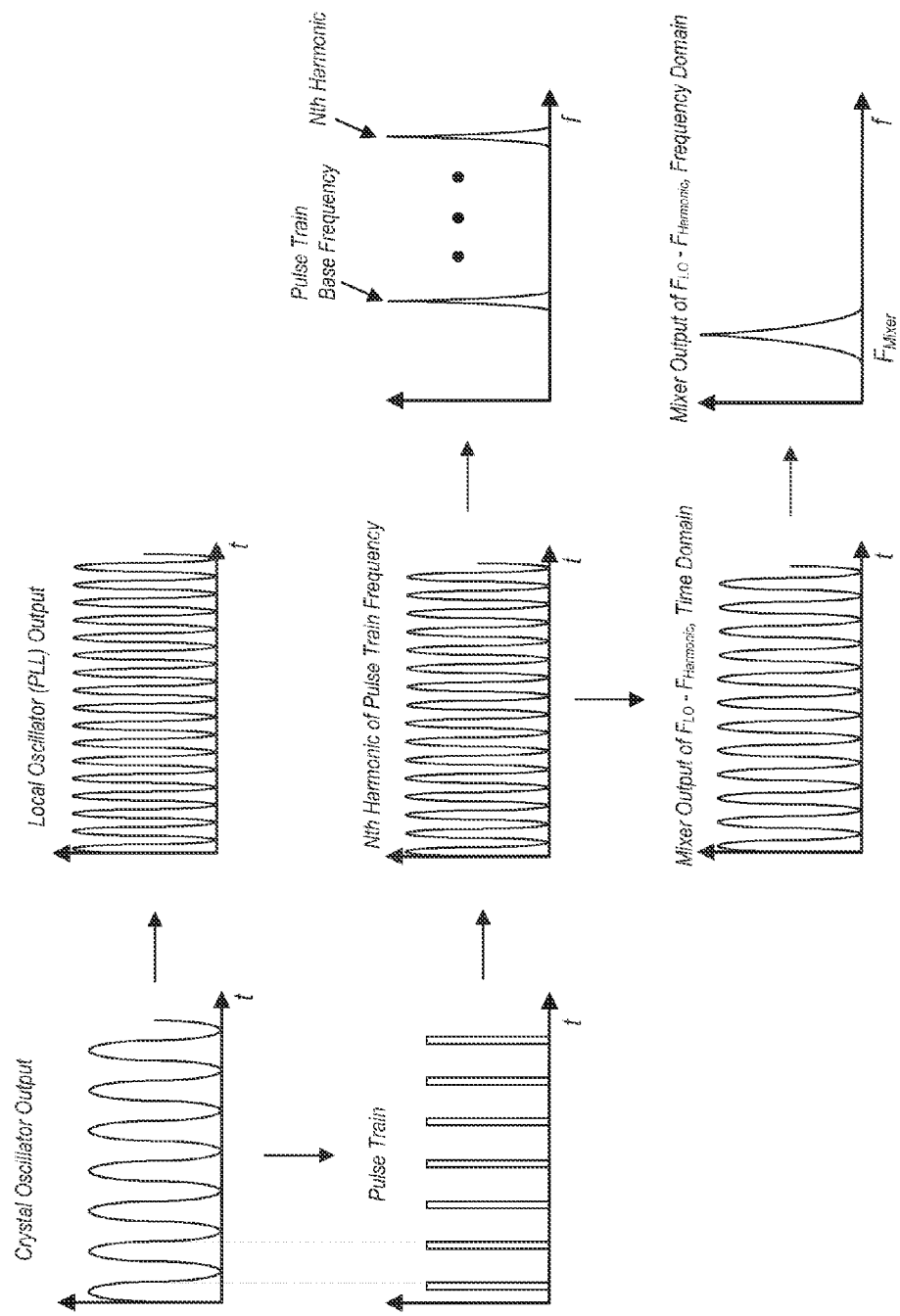
FIG. 3 is a graphic illustration of the generation of the signals used to perform a phase noise self-test for one embodiment of a radio receiver.

FIG. 3 is an illustration of the various signals produced during the BIST described above. It is noted that the drawing here is presented for illustrative purposes only, and is not intended to imply any actual frequency of particular signals. Furthermore, the relative magnitudes, periods (and corresponding frequencies) are not shown in scale to one another, and are thus only shown here to illustrate their basic relationships to one another in terms of frequency.

In the illustration, an exemplary periodic signal output generated by a crystal oscillator is shown in the upper left hand portion. As described above, this signal may be provided to both a pulse generator and a PLL of a local oscillator. In the pulse generator, the periodic signal received from the crystal oscillator may form the basis for the corresponding pulse train shown in the drawing. The periodic signal generated by the crystal oscillator may also form the basis for the local oscillator output signal shown in the drawing, which may have a frequency greater than that periodic signal produced by the crystal oscillator.

As described above, the pulse train may produce a number of tones that are spaced (in the frequency domain) at harmonic multiples of the base frequency. The desired harmonic may be a tone at the Nth harmonic multiple of the base frequency of the pulse train. In the illustrated example, the Nth harmonic multiple is shown in both the time and frequency domains.

The pulse train with its associated harmonics, including the Nth harmonic multiple, and the local oscillator output signal may be input into a mixer in order to produce yet another signal. The mixer output signal may include a downconverted version of the Nth harmonic, which is shown in the bottom row of the illustration, in both the time and frequency domains. In the embodiments discussed above, the frequency of the downconverted Nth harmonic may be less than that of the local oscillator output signal, and may also be less than the base frequency of the pulse train. The mixer output signal may be low pass filtered to allow the downconverted Nth harmonic to pass while attenuating higher frequencies. An ADC may then convert the remaining signal into a digital counterpart. The digital counterpart may then be used by digital processing circuitry to determine the phase noise of the mixer output signal. As noted above, the phase noise of the mixer output signal may be dominated by the phase noise of the local oscillator output signal. Accordingly, the phase noise of the mixer output signal may be used to determine the phase noise of the local oscillator output signal.

Figure 4:
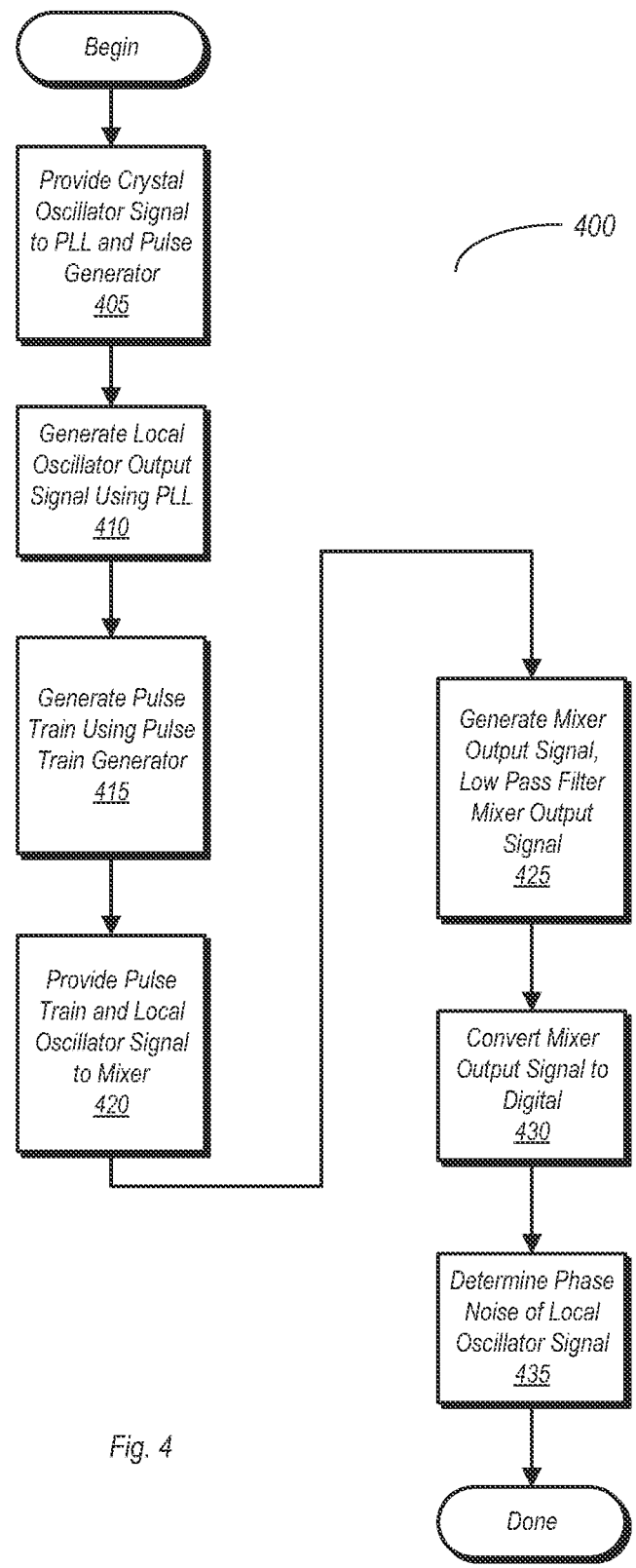
FIG. 4 is a flow diagram illustrating one embodiment of a method for performing a phase noise self-test.

Turning now to FIG. 4, a flow diagram illustrating one embodiment of a method for performing a phase noise self-test is shown. The embodiment of method 400 illustrated in FIG. 4 may be performed using either of the embodiments shown in FIGS. 1 and 2. Additionally, the performing of method 400 on embodiments of IC's having receivers and pulse generators implemented thereon not explicitly discussed herein is also possible and contemplated.

Method 400 begins with the generation of a periodic signal by an oscillator, such as a crystal oscillator (block 405). Other types of oscillators may be used in place of a crystal oscillator. The crystal (or other type) of oscillator may be a component of a local oscillator. The periodic signal generated by the crystal (or other type) oscillator may be provided to a pulse generator and a PLL of the local oscillator. Responsive to the received periodic signal, the PLL may generate a local oscillator output signal (block 410). The pulse generator may generate a pulse train responsive to the received periodic signal (block 415).

The pulse train generated by the pulse generator may generate a number of harmonics at frequencies corresponding to multiples of the pulse train base frequency and having various energy levels across a frequency spectrum. If the pulses of the pulse train have a low duty cycle, the energy at the various harmonic frequencies may be relatively uniform for a significant portion of the spectrum. The pulse train and the local oscillator output signal may be input into a mixer (block 420). In some embodiments, the pulse train may be applied to a filter prior to being input into the mixer. The filter may be used to reject frequencies that are not close to the desired harmonic frequency. This may prevent saturation of the mixer with unwanted frequencies. In some cases, the filter output may be provided to a low noise amplifier, in other cases the filter output may be provided directly to the mixer.

The mixer may generate a mixer output signal which is then low pass filtered (block 425). In one embodiment, the mixer output signal may include a number of harmonic frequencies. Using one example, a crystal oscillator may produce a signal at 30 MHz, while it is desired to use the $31^{st}$ harmonic of the pulse train (930 MHz) as the harmonic frequency for determining the phase noise. The 30 MHz signal from the crystal oscillator may be provided to the pulse generator to produce a pulse train of substantially the same frequency. The pulse train may also produce a number of harmonics. Since the $31^{st}$ harmonic is desired, the PLL of the local oscillator may be set to a frequency near that of the frequency of the $31^{st}$ harmonic of the pulse train base frequency, e.g., 935 MHz. The pulse train and the output signal from the local oscillator may be input into the mixer. Responsive to these two signals, the mixer may produce output signals beginning at 5 MHz and spaced at 30 MHz. The 5 MHz signal is a result of mixing the $31^{st}$ harmonic (930 MHz) and the local oscillator signal (935 MHz), which produces a difference between the two. The remaining signals spaced at 30 MHz apart are the result of mixing and downconverting those harmonics about the $31^{st}$ with the local oscillator signal. The output of the mixer is then passed through a low pass filter, which allows the 5 MHz signal to pass but attenuates the remaining downconverted harmonics. Accordingly, the 5 MHz signal resulting from downconverting the $31^{st}$ harmonic remains after low pass filtering. It is noted that the frequency figures used in this paragraph are exemplary, and are not intended to be limiting.

The radio receiver may be a heterodyne receiver configured to convert an incoming RF signal into an intermediate frequency (IF), or may be a direct conversion receiver configured to convert an incoming RF signal to a baseband frequency. Accordingly, the mixer output signal may have a frequency corresponding to an IF signal or a baseband signal. Furthermore, since the pulse train and correspondingly produced harmonics have little phase variation, phase noise in the mixer output signal may be largely dependent on phase noise within the local oscillator output signal. Accordingly, determining the phase noise of the mixer output signal may provide a sufficiently accurate measure of the local oscillator phase noise.

The low pass filtered mixer output signal may be received by an ADC, which may generate a digital version thereof (block 430). The digital version of the mixer output signal may then be input into digital processing circuitry. The digital processing circuitry may use the digital version of the filtered mixer output signal to determine the phase noise of the local oscillator signal (block 435). If the method is performed in a production test environment, an indication of the phase noise may be output to allow determination as to whether the IC meets phase noise specifications.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. An integrated circuit comprising:
a radio receiver, wherein the radio receiver includes a local oscillator that is configured to generate a first periodic signal, wherein the local oscillator includes a crystal oscillator and a phase-locked loop (PLL), wherein the crystal oscillator is configured to provide the first periodic signal to the pulse generator and to the PLL, and wherein the PLL is configured to output a second periodic signal based on the first periodic signal; and
a pulse generator configured to generate a pulse train based on the first periodic signal;
wherein the radio receiver is configured to use the pulse train to conduct a self-test to determine an amount of phase noise generated by the local oscillator.

2. The integrated circuit as recited in claim 1, wherein the pulse generator is configured to produce a third periodic signal that is a harmonic multiple of a frequency of the pulse train.

3. The integrated circuit as recited in claim 2, wherein the radio receiver further includes a mixer, wherein the mixer is coupled to receive the second and third periodic signals and is configured to produce a mixer output signal including a fourth periodic signal based on the second and third periodic signals, wherein the fourth periodic signal has a frequency that is less than the frequency of the second and third periodic signals.

4. The integrated circuit as recited in claim 3, wherein the radio receiver further includes:
a low pass filter coupled to receive the mixer output signal, wherein the low pass filter is configured to allow the fourth periodic signal to pass and is further configured to attenuate the mixer output signal at frequencies above a cutoff frequency greater than a frequency of the fourth periodic signal; and
an analog-to-digital converter (ADC) coupled to receive the fourth periodic signal from the low pass filter, wherein the ADC is configured to generate a digital representation of the fourth periodic signal.

5. The integrated circuit as recited in claim 4, wherein the radio receiver further includes a digital processing circuit, wherein the digital processing circuit is coupled to receive the digital representation of the fourth periodic signal, and wherein the digital processing circuit is configured to determine the phase noise based on the digital representation of the fourth periodic signal.

6. The integrated circuit as recited in claim 4, wherein the radio receiver further includes a programmable gain amplifier coupled between the low pass filter and the ADC, wherein the programmable gain amplifier is configured to amplify the fourth periodic signal.

7. The integrated circuit as recited in claim 2, wherein the radio receiver further includes a low noise amplifier (LNA), wherein the LNA is configured to amplify the pulse train and the third periodic signal.

8. A method comprising:
generating a pulse train within an integrated circuit;
providing the pulse train to a radio receiver located on the integrated circuit; and
conducting a self-test to determine an amount of phase noise generated by a local oscillator of the radio receiver, wherein the self-test is conducted using the pulse train; wherein the local oscillator includes a crystal oscillator and a phase-locked loop (PLL), and wherein the method further comprises:
providing a first periodic signal to the PLL, wherein the first periodic signal is generated by the crystal oscillator;
generating a second periodic signal, using the PLL, based on the first periodic signal;
generating the pulse train based on the first periodic signal using a pulse generator.

9. The method as recited in claim 8, further comprising:
the pulse train producing a plurality of periodic signals at harmonic multiples of a based frequency of the pulse train, wherein the plurality of periodic signals includes a third periodic signal.

10. The method as recited in claim 9, further comprising:
providing the second and third periodic signals to a mixer;
generating, using the mixer, a mixer output signal including a fourth periodic signal based on the second and third periodic signals, wherein the fourth periodic signal has a frequency that is less than the frequency of the second and third periodic signals.

11. The method as recited in claim 10, further comprising:
low pass filtering the mixer output signal, wherein said low pass filtering includes passing the fourth periodic signal and attenuating signals above a cutoff frequency greater than that of the fourth periodic signal; and
generating a digital representation of the fourth periodic signal.

12. The method as recited in claim 11, further comprising determining the phase noise generated by the local oscillator using the digital representation of the fourth periodic signal.

13. The method as recited in claim 11, further comprising amplifying the fourth periodic signal using a programmable gain amplifier coupled to an input of an analog-to-digital converter configured to generate the digital representation of the fourth periodic signal.

14. The method as recited in claim 9, further comprising amplifying the third periodic signal using a low noise amplifier coupled between an output of the filter and an input of the mixer.

15. An integrated circuit comprising:
a local oscillator including a crystal oscillator configured to generate a first periodic signal;
a pulse generator coupled to receive first the periodic signal and configured to generate a pulse train at a frequency corresponding to the first periodic signal;
a mixer coupled to receive a second periodic signal based on the pulse train and a third periodic signal from a local oscillator, wherein the second periodic signal has a frequency that is a harmonic multiple of a frequency of the pulse train, and wherein the mixer is configured to output a mixer output signal including a fourth periodic signal having a frequency less than the frequency of the second and third periodic signals; and
a processing circuit configured to determine phase noise of the local oscillator based on the fourth periodic signal.

16. The integrated circuit as recited in claim 15, wherein the local oscillator further includes a phase locked loop (PLL) coupled to receive the first periodic signal from the crystal oscillator and configured to generate the third periodic signal based on the first periodic signal.

17. The integrated circuit as recited in claim 15, further comprising an analog-do-digital converter (ADC) coupled between an output of the mixer and an input to the processing circuit, wherein the ADC is configured to generate a digital version of the fourth periodic signal, and wherein the processing circuit is configured to determine the phase noise of the local oscillator using the digital version of the fourth periodic signal.

18. The integrated circuit as recited in claim 15, further comprising a low pass filter coupled to receive the mixer output signal, wherein the low pass filter is configured to pass the fourth periodic signal and further configured to attenuate signals having a frequency above a cutoff frequency that is greater than that of the fourth periodic signal.

* * * * *